W. T. J. LYNCH.
FEATHER FASTENER.
APPLICATION FILED SEPT. 24, 1914.
1,155,428.
Patented Oct. 5, 1915.
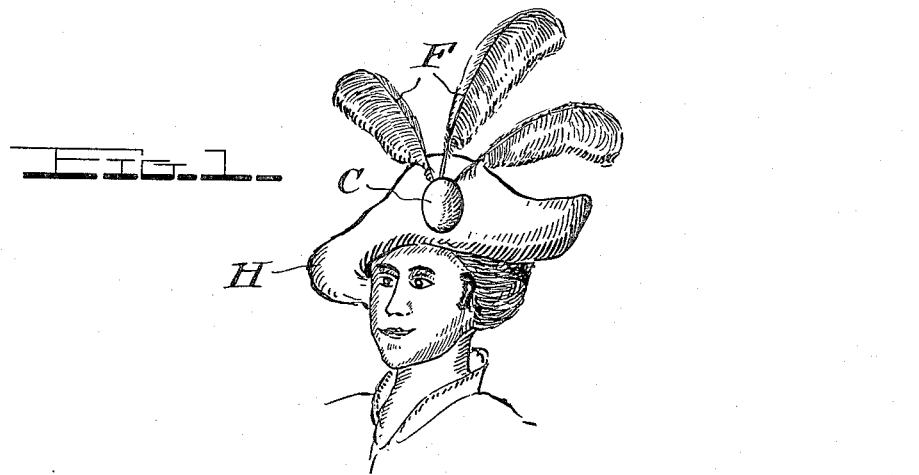
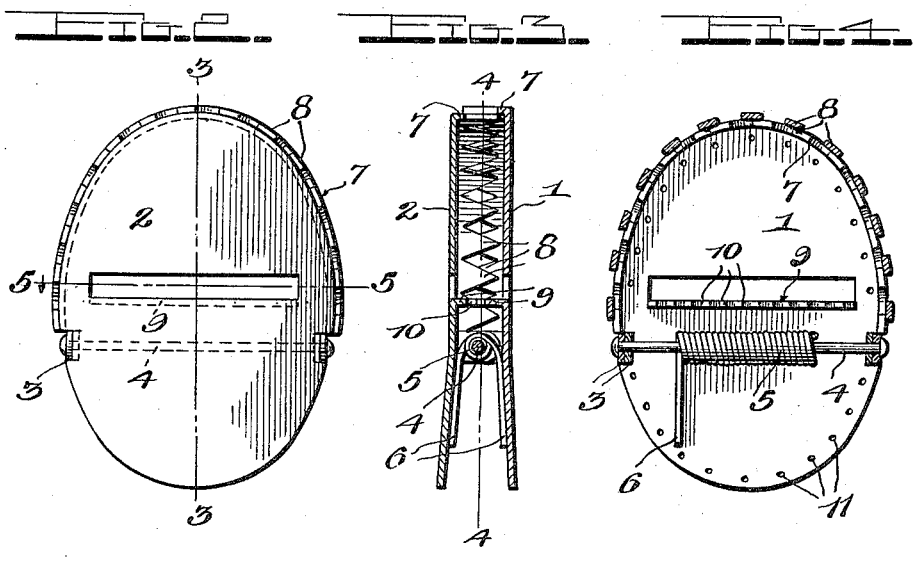
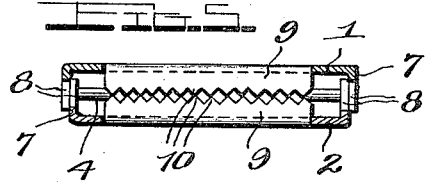
Inventor
William T. J. Lynch,
Witnesses Jump to claim...

UNITED STATES PATENT OFFICE.

WILLIAM T. J. LYNCH, OF BROOKLYN, NEW YORK, ASSIGNOR OF ONE-HALF TO VAL J. SCHULTHEIS, OF BROOKLYN, NEW YORK.

FEATHER-FASTENER.

1,155,428.      Specification of Letters Patent.      Patented Oct. 5, 1915.

Application filed September 24, 1914. Serial No. 863,333.

*To all whom it may concern:*

Be it known that I, WILLIAM T. J. LYNCH, citizen of the United States, residing at Brooklyn, in the county of Kings and State of New York, have invented certain new and useful Improvements in Feather-Fasteners; and I do declare the following to be a full, clear, and exact description of the invention, such as will enable others skilled in the art to which it appertains to make and use the same.

My invention relates broadly to devices for attaching articles to wearing apparel and more particularly to a clip for attaching a plurality of feathers to a hat.

The main object of the invention is to provide an extremely simple device designed to be attached to a lady's hat for the purpose of removably securing one or more feathers or plumes in position thereon.

In carrying out the above end, a further object of the invention becomes to provide a device which will present an attractive appearance and which will be efficient in operation.

With the above and minor objects in view, the invention resides in certain novel features of construction and combination herein described and claimed and shown in the drawings wherein:

Figure 1 is a perspective view showing the application of the device to use; Fig. 2 is a front elevation of the clip proper; Fig. 3 is a vertical section as seen on the line 3—3 of Fig. 2; Fig. 4 is a vertical section taken on the line 4—4 of Fig. 3, and Fig. 5 is a horizontal section as seen on the line 5—5 of Fig. 2.

In the accompanying drawings, I have shown my invention as comprising rear and front plates 1 and 2 which are here shown as substantially elliptical in contour, each plate having a pair of pivot ears 3, the ears of one contacting with the ears of the other in order that a transverse pivot pin 4 may be passed through said ears for the purpose of pivotally connecting the rear and front plates 1 and 2. As is common with most devices of this character, a coil spring 5 encircles the pivot pin 4 and has its opposite ends 6 bearing against the lower ends of the plates 1 and 2, thereby tending to force the upper end portions of the plates toward each other.

The upper end portions of the plates 1 and 2 are here shown as provided with laterally projecting gripping flanges 7 on their edges, the flange of one plate contacting with the flange of the other plate. Although the construction so far described would probably suffice, it becomes expedient to notch the edges of the flanges 7 to provide a plurality of gripping teeth 8, as most clearly seen in Fig. 3.

In addition to the gripping flanges above described, the plates 1 and 2 are provided with inwardly struck gripping flanges 9 which lie parallel to the pivot pin 4 and which are spaced inwardly from the flanges 7. These flanges 9 may be toothed as most clearly seen at 10 in Fig. 5, or their adjacent edges may be formed in any appropriate manner.

With the parts as above described, the rear plate 1 is secured to a hat H by stitching through a plurality of perforations 11 which are formed near the edge of said plate and the front plate is provided with an ornamental covering, indicated at C in Fig. 1, thereby producing a rather neat appearance when the device is applied to a hat and by moving the lower ends of the plates 1 and 2 toward each other, it will be noted that the flanges 7 and 9 will recede, thereby allowing the stems of a number of feathers or plumes F to be correctly positioned between said flanges whereupon, when the plates are released, the spring 6 will force the upper ends of said plates 1 and 2 toward each other, to securely yet removably grip the feather stems, it being understood that the free ends of said stems are gripped by the teeth on the flanges 9, while the portions thereof adjacent the feathers proper are gripped by the teeth on the flanges 7. It will therefore be seen that the provision of the two sets of gripping flanges is an important feature since the feathers are retained in properly spaced relation at all times.

The device becomes extremely advantageous when packing hats for the purpose of shipping the same, since the various plumes or other decorations thereon may be readily removed, thus allowing a smaller box to be employed and lessening the danger of mutilating the plumes.

I have set forth certain specific formations for carrying out the objects of the invention, and have described the flanges 7 and 9 as equipped with gripping teeth, but I wish it understood that a device constructed similarly to the above described article and provided with plain gripping flanges or with flanges provided with differently shaped teeth, lies clearly within the scope of the present invention.

In addition to the above, I wish it understood that the device may be employed not only for attaching feathers and plumes to a hat, but may be used for securing birds, artificial flowers, ribbons, bows and other hat decorations thereto, that I need not be limited to the precise manner in which I have illustrated the device as attached to a hat, since any appropriate means could be provided for this purpose, that the cover C could be made in any shape or design and, in fact, that this device might well be formed directly on the front plate 2, and that a device, constructed as above set forth, of round, square, triangular, or other formation would lie clearly within the scope of the present invention.

Having thus described my invention, what I claim and describe and desire to secure by Letters Patent is:

1. A device of the class described comprising a pair of substantially parallel plates pivoted together to move toward and away from each other, a pair of gripping flanges extending inwardly toward each other from the edges of the two plates disposed to one side of the pivotal axis, an additional pair of gripping flanges projecting inwardly toward each other from the bodies of the plates and disposed between the pivotal axis and the aforesaid flanges, and a spring for rocking the two plates and their flanges toward each other.

2. A device of the class described comprising a pair of substantially parallel plates pivoted together and adapted to move toward and away from each other, a pair of coacting gripping members projecting inwardly from the adjacent faces of said plates at points remote from the pivotal axis, an additional pair of such gripping members projecting inwardly from said adjacent faces of the plates and disposed between the pivotal axis and the aforesaid members, and a spring for forcing the plates and the gripping members toward each other.

3. A device of the class described comprising a pair of elongated plates lying substantially parallel to each other and having laterally extending pivot ears, a transversely extending pivot pin passing through said ears, whereby the two plates are pivoted to each other, a pair of crescent-shaped flanges projecting laterally toward each other from the edges of the plates to one side of the pivot pin, an additional pair of flanges projecting toward each other from the two plates and disposed between the pivot pin and the aforesaid flanges, and a spring for forcing the two plates and their flanges toward each other.

In testimony whereof I have hereunto set my hand in presence of two subscribing witnesses.

WILLIAM T. J. LYNCH.

Witnesses:
 VAL J. SCHULTHEIS,
 RICHARD M. LANE.

Copies of this patent may be obtained for five cents each, by addressing the "Commissioner of Patents, Washington, D. C."